(No Model.)

A. A. BROOKS.
CAR TRUCK.

No. 278,495. Patented May 29, 1883.

WITNESSES:
Donn Twitchell.
C. Sedgwick.

INVENTOR:
A. A. Brooks
BY Munn & Co.
ATTORNEYS.

UNITED STATES PATENT OFFICE.

AUSTIN A. BROOKS, OF EAU CLAIRE, WISCONSIN, ASSIGNOR OF ONE-HALF TO JOHN A. WHITFIELD AND HENRY M. WILCOX, OF SAME PLACE.

CAR-TRUCK.

SPECIFICATION forming part of Letters Patent No. 278,495, dated May 29, 1883.

Application filed March 13, 1883. (No model.)

*To all whom it may concern:*

Be it known that I, AUSTIN A. BROOKS, of Eau Claire, in the county of Eau Claire and State of Wisconsin, have invented a new and Improved Railway-Truck, of which the following is a full, clear, and exact description.

The object of my improvements is to prevent the serious damage that usually results when car and locomotive trucks leave the rails, such as the overturning of the car or locomotive; and the invention consists in guard-wheels combined with the trucks for retaining the latter in line with the rails in case the tread-wheels leave the track, and in a supplemental axle-bearing for preventing the axle from dropping in case of breakage, as hereinafter described and claimed.

Reference is to be had to the accompanying drawings, forming a part of this specification, in which similar letters of reference indicate corresponding parts in both the figures.

Figure 1:
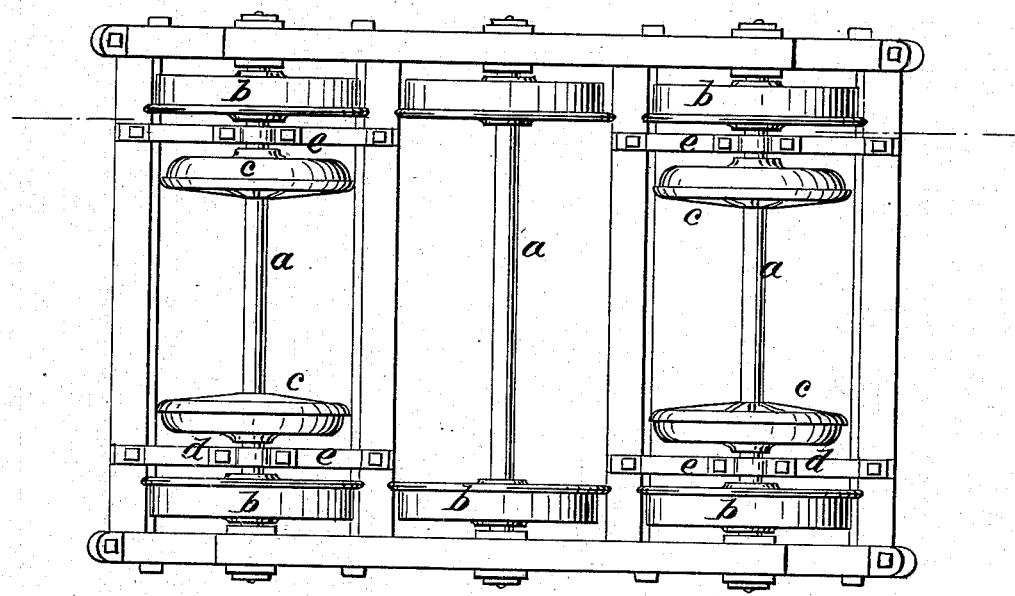
Figure 2:
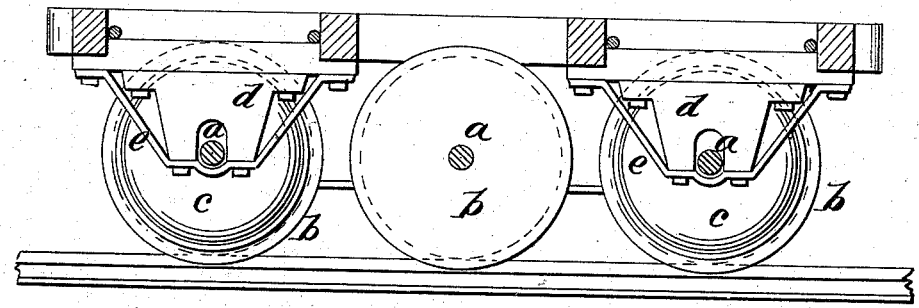

Figure 1 is an inverted plan view of a railroad-truck with my improvements, and Fig. 2 is a longitudinal section on line $x\,x$ of Fig. 1.

The truck shown is of ordinary construction, and the axles $a$ and tread-wheels $b$ of usual character. On a truck with four or more wheels the guard-wheels are applied, as shown at $c\,c$, to the end axles next to the inner sides of the tread-wheels, with space between each tread-wheel $b$ and its guard-wheel $c$ slightly more than the width of the rails. The guard-wheels $c$ are of smaller diameter than wheels $b$, and are formed with beveled rims. Between the guard and the tread wheels there are fixed to the trucks slotted pedestals $d$, that set over the axles $a$, and to the lower ends of the pedestals straps $e$ are bolted, the ends of the straps being secured to the trucks, so as to brace the parts. The slots in the pedestals are arranged to form bearings for the axles; but they are made of a depth sufficient to prevent any contact or friction so long as the axles remain intact and supported by the usual bearings at the ends.

With a truck having these devices, in case the tread-wheels jump the track or leave the rails in consequence of a broken axle, the guard-wheels $c$, taking against the inner sides of the rails, will retain the truck in line, and thus prevent it from becoming twisted and torn loose. The broken axle is prevented from dropping and twisting by the pedestal $d$ and strap $e$. In this manner the liability of cars and locomotive being overturned or thrown from the track by derailment of any of the trucks is prevented.

These devices are simple and inexpensive, and they can be readily applied to any truck without change. The guard-wheels may be placed at the outside, so as to take against the outer side of rails in case of derailment. That would be the preferable arrangement of locomotives.

Having thus described my invention, I claim as new and desire to secure by Letters Patent—

In railway-trucks, the combination, with the axles $a$ and tread-wheels $b$, of the guard-wheels $c$ and the auxiliary pedestals $d$, with the axles $a$ strapped therein and arranged between the tread-wheels and the guard-wheels, essentially as shown and described, and for the purpose set forth.

AUSTIN A. BROOKS.

Witnesses:
L. M. VILAS,
C. L. SULLIVAN.